(12) United States Patent
Chen et al.

(10) Patent No.: US 7,788,576 B1
(45) Date of Patent: Aug. 31, 2010

(54) GROUPING OF DOCUMENTS THAT CONTAIN MARKUP LANGUAGE CODE

(75) Inventors: Hsin-Yi Chen, Taipei (TW); Dung-Jou Tsai, Taipei (TW); Guan-Liang Chen, Taipei (TW); Cheng-Hsin Hsu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1001 days.

(21) Appl. No.: 11/542,820

(22) Filed: Oct. 4, 2006

(51) Int. Cl.
*G06F 17/00* (2006.01)
*G06F 3/00* (2006.01)

(52) U.S. Cl. ..................... 715/234; 715/752
(58) Field of Classification Search ................ 715/234, 715/237, 271, 752
See application file for complete search history.

(56) References Cited

U.S. PATENT DOCUMENTS

| | | | |
|---|---|---|---|
| 5,442,699 | A | 8/1995 | Arnold et al. |
| 5,452,442 | A | 9/1995 | Kephart |
| 5,640,492 | A | 6/1997 | Cortes et al. |
| 5,649,068 | A | 7/1997 | Boser et al. |
| 5,907,834 | A | 5/1999 | Kephart et al. |
| 6,161,130 | A | 12/2000 | Horvitz et al. |
| 6,192,512 | B1 | 2/2001 | Chess |
| 6,279,128 | B1 | 8/2001 | Arnold et al. |
| 6,622,134 | B1 | 9/2003 | Sorkin |
| 6,650,890 | B1 | 11/2003 | Irlam et al. |
| 6,711,583 | B2 | 3/2004 | Chess et al. |
| 6,732,157 | B1 | 5/2004 | Gordon et al. |
| 6,789,200 | B1 | 9/2004 | Fiveash et al. |
| 6,813,712 | B1 | 11/2004 | Luke |
| 7,660,989 | B2 * | 2/2010 | Tomkow ................... 713/170 |
| 7,725,544 | B2 * | 5/2010 | Alspector et al. ........... 709/206 |
| 2003/0009694 | A1 * | 1/2003 | Wenocur et al. ............ 713/201 |
| 2004/0073617 | A1 * | 4/2004 | Milliken et al. ............. 709/206 |
| 2004/0148500 | A1 * | 7/2004 | Olkin et al. ................. 713/150 |
| 2005/0010644 | A1 | 1/2005 | Brown et al. |
| 2005/0060643 | A1 * | 3/2005 | Glass et al. ............... 715/501.1 |
| 2005/0080860 | A1 * | 4/2005 | Daniell et al. .............. 709/206 |

(Continued)

FOREIGN PATENT DOCUMENTS

EP 1 377 892 B1 9/2004

(Continued)

OTHER PUBLICATIONS

Spam Assassin 2.64, Aug. 2004, 4 sheets. Webpage [online] [retrieved on Sep. 7, 2004]. Retrieved from the internet: http://www.spamassasin.apache.org.

(Continued)

*Primary Examiner*—Laurie Ries
(74) *Attorney, Agent, or Firm*—Okamoto & Benedicto LLP

(57) ABSTRACT

In one embodiment, a fingerprint is generated for each document (e.g., e-mail, web page) containing markup language (e.g., HTML) code. The fingerprint is indicative of the structure of the markup language code in the document. The fingerprint may be formed by extracting markup language tags from the document and then linking together the extracted tags to form a single string. The fingerprint may be hashed through a hashing function to generate a signature key that may be used to create a directory for the document and other documents having the same fingerprint. The grouping of documents with the same fingerprint facilitates creation of anti-spam rules or identification of web pages from particular websites, for example.

20 Claims, 5 Drawing Sheets

U.S. PATENT DOCUMENTS

2005/0097179 A1* 5/2005 Orme .................. 709/207
2005/0223027 A1* 10/2005 Lawrence et al. ....... 707/103 R
2006/0161986 A1 7/2006 Singh et al.

FOREIGN PATENT DOCUMENTS

WO  WO 02/084459 A1  10/2002

OTHER PUBLICATIONS

The Formulation of Support Vector Machine, 1998, 2 sheets [retrieved on Jul. 21, 2004]. Retrieved from the internet: http://www.mi-eng.cam.ac.uk/kkc21/main/node8.

New Advance Anti-Spam Service, "Aladdin Knowledge Systems Launches New Advanced Anti-Spam Service" Jun. 26, 2003, 3 sheets. Webpage [online] [retrieved on Jul. 21, 2004]. Retrieved from the internet: http://www.ealladin.com/new/2003/esafe/anti-spam.asp.

SVM-Light Support Vector Machine 6.01, Feb. 2004, 14 sheets. Webpage [online][retrieved on Sep. 9, 2004]. Retrived from the internet: http://www.cs.cornell.edu/People/tj/svm_light.

Steve Ramsay's Guide to Regular Expressions, Electronic Text Center, University of Virginia, 12 sheets [retrieved on Sep. 2, 2004]. Retreived from the internet: <URL:http://www.etext.lib.virginia.edu/helpsheets/regex.

Markup language—from Wikipedia, the free encyclopedia, Aug. 2006, 8 sheets [retrieved on Aug. 28, 2006]. Retrieved from the internet: http://en.wikipedia.org/wiki/Markup_language.

MD5—from Wikipedia, the free encyclopedia, Aug. 2006, 7 sheets [retrieved on Aug. 28, 2006]. Retrieved from the internet: http://en.wikipedia.org/wiki/MD5.

* cited by examiner

```
<!DOCTYPE HTML PUBLIC "-//W3C//DTD HTML 4.0 Transitional//EN">
<HTML>
<HEAD>
<META content=3D"MSHTML 6.00.2800.1106" name=3DGENERATOR>
<STYLE></STYLE>
</HEAD>
<BODY bgColor=3D#ffffff>
<DIV>
<H2>Via<BR>Val<BR>Cia<BR></H2>
</DIV>
<DIV><H2>gra<BR>ium <BR>lis<BR></H2>
</DIV>
<DIV><H2>only<BR>only<BR>only <BR></H2>
</DIV>
<DIV><H2>$3<BR>$1<BR>$3<BR></H2>
</DIV>
<DIV><H2>,3<BR>,2<BR>,7<BR></H2>
</DIV>
<DIV><H2>3<BR>1<BR>5<BR></H2>
</DIV>
<DIV>
<FONT face=3DArial size=3D2>And many other
<A href==3D"http://www.bestaoge.com">
<FONT face=3DArial size==3D2>http://www.bestaoge.com</FONT>
</A>
</FONT>
</DIV>
</BODY>
</HTML>
```

FIG. 3(a)

```
<!DOCTYPE>
<HTML>
<HEAD>
<META>
<STYLE></STYLE>
</HEAD>
<BODY>
<DIV>
<H2><BR><BR><BR></H2>
</DIV>
<DIV><H2><BR><BR><BR></H2>
</DIV>
<DIV><H2><BR><BR><BR></H2>
</DIV>
<DIV><H2><BR><BR><BR></H2>
</DIV>
<DIV><H2><BR><BR><BR></H2>
</DIV>
<DIV><H2><BR><BR><BR></H2>
</DIV>
<DIV>
<FONT>
<A>
<FONT></FONT>
</A>
</FONT>
</DIV>
</BODY>
</HTML>
```

FIG. 3(b)

```
 1  <!DOCTYPE>(/x0d/x0a)<HTML>(/x0d/x0a)<HEAD>(/x0d/x0a)<META>(/x0d/x0a)
 2  <STYLE></STYLE>(/x0d/x0a)</HEAD>(/x0d/x0a)<BODY>(/x0d/x0a)
 3  <DIV>(/x0d/x0a)<H2><BR><BR><BR></H2>
 4  </DIV>(/x0d/x0a)<DIV><H2><BR><BR><BR></H2>
 5  </DIV>(/x0d/x0a)<DIV><H2><BR><BR><BR></H2>
 6  </DIV>(/x0d/x0a)<DIV><H2><BR><BR><BR></H2>
 7  </DIV>(/x0d/x0a)<DIV><H2><BR><BR><BR></H2>
 8  </DIV>(/x0d/x0a)<DIV><H2><BR><BR><BR></H2>
 9  </DIV>(/x0d/x0a)<DIV>(/x0d/x0a)<FONT>
10  <A>(/x0d/x0a)<FONT></FONT>(/x0d/x0a)</A>
11  </FONT>(/x0d/x0a)</DIV>(/x0d/x0a)</BODY>(/x0d/x0a)</HTML>
```

FIG. 3(c)

```
<!DOCTYPE>(/x0d/x0a)<HTML>(/x0d/x0a)<HEAD>(/x0d/x0a)<META>(/x0d/x0a)
<STYLE></STYLE>(/x0d/x0a)</HEAD>(/x0d/x0a)<BODY>(/x0d/x0a)
<DIV>(/x0d/x0a)<H2><BR><BR><BR></H2>
</DIV>(/x0d/x0a)<DIV><H2><BR><BR><BR></H2>
</DIV>(/x0d/x0a)<DIV><H2><BR><BR><BR></H2>
</DIV>(/x0d/x0a)<DIV><H2><BR><BR><BR></H2>
</DIV>(/x0d/x0a)<DIV><H2><BR><BR><BR></H2>
</DIV>(/x0d/x0a)<DIV><H2><BR><BR><BR></H2>
</DIV>(/x0d/x0a)<DIV>(/x0d/x0a)<FONT>
<A>(/x0d/x0a)<FONT></FONT>(/x0d/x0a)</A>
</FONT>(/x0d/x0a)</DIV>(/x0d/x0a)</BODY>(/x0d/x0a)</HTML>
```

FIG. 3(d)

GROUPING OF DOCUMENTS THAT CONTAIN MARKUP LANGUAGE CODE

BACKGROUND OF THE INVENTION

1. Field of the Invention

The present invention relates generally to data processing, and more particularly but not exclusively to anti-spam and web page identification.

2. Description of the Background Art

E-mail provides a convenient, fast, and relatively cost-effective way of sending messages to a large number of recipients. It is thus no wonder that solicitors, such as some advertisers, use e-mail to indiscriminately send messages to e-mail accounts accessible over the Internet. These unsolicited e-mails, also referred to as "junk mail" or "spam", are not only a nuisance, but also translate to lost time and money as employees or home users are forced to segregate them from legitimate e-mails. Anti-spam programs and services are commercially available to help users identify and remove spam. Some anti-spam programs use heuristic rules to identify spam. The rule creator examines multitudes of spam, find patterns among them, and create rules that look for the patterns in received e-mails. Finding patterns require grouping of the same or similar spam, which is a time consuming process that often requires manual intervention. Identification of web pages involves similar tasks, and thus faces similar problems, as spam detection. Therefore, techniques for facilitating grouping and identification of documents, such as e-mails and web pages, are generally desirable.

SUMMARY

In one embodiment, a fingerprint is generated for each document (e.g., e-mail, web page) containing markup language (e.g., HTML) code. The fingerprint is indicative of the structure of the markup language code in the document. The fingerprint may be formed by extracting markup language tags from the document and then linking together the extracted tags to form a single string. The fingerprint may be hashed through a hashing function to generate a signature key that may be used to create a directory for the document and other documents having the same fingerprint. The grouping of documents with the same fingerprint facilitates creation of anti-spam rules or identification of web pages from particular websites, for example.

These and other features of the present invention will be readily apparent to persons of ordinary skill in the art upon reading the entirety of this disclosure, which includes the accompanying drawings and claims.

DESCRIPTION OF THE DRAWINGS

FIGS. 3(*a*), 3(*b*), 3(*c*), and 3(*d*) illustrate an example processing of an e-mail using the method of FIG. 2.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

A markup language is a computer programming language that includes text and additional information about the text. The additional information, also referred to as "tags," may indicate the text's structure and presentation layout and instructions on how to handle the text. Examples of markup languages include HTML, SGML, and XML. HTML (HyperText Markup Language) is the most well known markup language employed on the Internet. Although popularly used for web pages, HTML is also used to describe the body of an e-mail message. HTML is supported by several e-mail programs, including the Microsoft Outlook™ software.

A problem with e-mails containing markup language code is that the content of the e-mail does not have to be in the e-mail itself, but can be stored in a remote web server and merely referenced in the e-mail. For example, spammers may use HTML to slightly vary the contents of spam e-mails or use graphical content to make it difficult for conventional anti-spam algorithms to identify them. Another problem with emails that contain markup language code is that they are not easily classified, usually requiring manual effort to be grouped with like emails for heuristic anti-spam training and the like. As will be more apparent below, embodiments of the present invention allow generation of fingerprints of documents containing markup language code to facilitate grouping and identification of similarly-structured documents.

Figure 1:
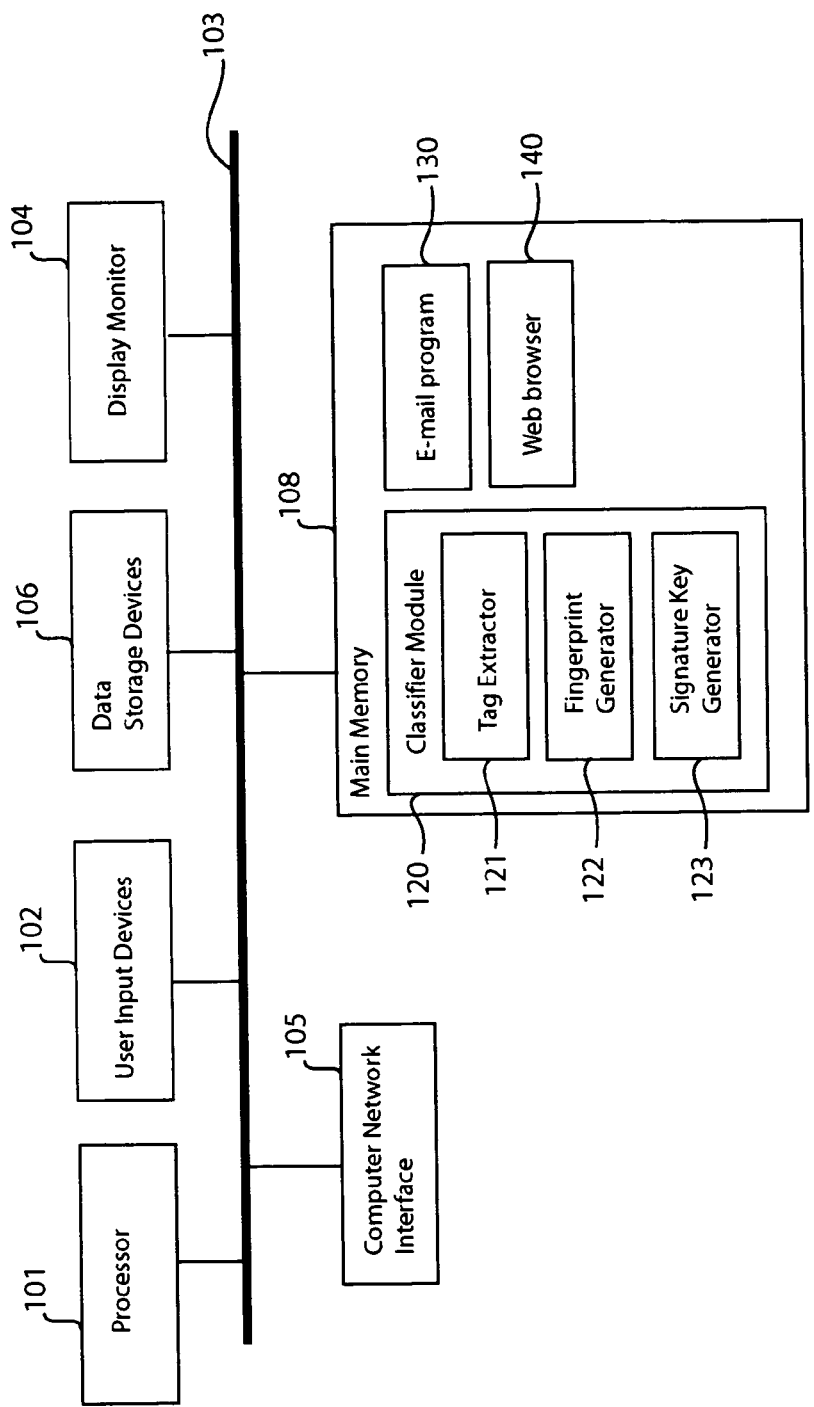
FIG. 1 shows a schematic diagram of an example computer that may be used in embodiments of the present invention.

FIG. 1 shows a schematic diagram of an example computer that may be used in embodiments of the present invention. The computer shown in the example of FIG. 1 may be employed as a server computer or a client computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). In the example of FIG. 1, the main memory 108 includes a classifier module 120, an e-mail program 130, and a web browser 140. The classifier module 120, the e-mail program 130, and the web browser 140 may comprise computer-readable program code that may be executed by the processor 101.

The e-mail program 130 may comprise a commercially available e-mail client (e.g., Microsoft Outlook™ software) if the computer of FIG. 1 is configured as a client computer, or a commercially available e-mail server (e.g., Microsoft Outlook™Exchange e-mail server) if the computer of FIG. 1 is configured as a server computer. The e-mail program 130 may be configured to receive e-mails in the computer of FIG. 1.

The web browser 140 may comprise a commercially available web browser, such as the Microsoft Internet Explorer™ web browser, for example. The web browser 140 may be configured to receive and display web pages in the computer of FIG. 1.

The classifier module 120 may comprise computer-readable program code for identifying and grouping documents, such as e-mails and web pages, containing markup language code. The classifier module 120 may be configured to examine a plurality of documents, identify documents, and group together those that have structurally similar markup language code. For example, the classifier module 120 may be configured to find structurally similar e-mails among a plurality of e-mails, and segregate the structurally similar e-mails into a separate group. E-mails in a particular group may be examined for a common pattern for purposes of developing anti-spam rules. The rules or the pattern itself may be employed to identify similar e-mails.

The classifier module 120 is implemented in software in the example of FIG. 1. As can be appreciated, the classifier module 120 may also be implemented in hardware or a combination of hardware and software (e.g., firmware). In the example of FIG. 1, the classifier module 120 comprises a tag extractor 121, a fingerprint generator 122, and a signature key generator 123.

The tag extractor 121 may comprise computer-readable program code for extracting markup language tags from documents that contain markup language code. In one embodiment, the tag extractor 121 is configured to extract HTML tags from e-mails and web pages. For example, the tag extractor 121 may parse an e-mail from the e-mail program 130, extract HTML tags from the e-mail, and provide the extracted HTML tags to the fingerprint generator 122. Similarly, the tag extractor 121 may parse a web page displayed in the web browser 140, extract HTML tags from the web page, and provide the extracted HTML tags to the fingerprint generator 122. As will be more apparent below, the extracted HTML tags may be used to create a fingerprint of the document.

The fingerprint generator 122 may comprise computer-readable program code for generating a fingerprint of a document containing markup language code. The fingerprint is an identifier that indicates the structure of the markup language code in the document. The fingerprint may be used to identify similarly-structured documents, such as those with the same tags and arrangement of tags. In one embodiment, the fingerprint generator 122 generates a fingerprint or structure identifier of a document by forming together tags extracted by the tag extractor 121 from the document. For example, the fingerprint generator 122 may link together all extracted HTML tags into a single string, with the single string being used as the fingerprint of the document. The fingerprint generator 122 may link together the HTML tags by concatenating them, using a predetermined code to demarcate where the HTML tags are linked together.

The signature key generator 123 may comprise computer-readable program code for generating a signature key for the fingerprint of a document. The signature key comprises a unique identifier for the fingerprint. The signature key is shorter and more compact than the fingerprint, providing a more manageable identifier that can be used to name a file directory containing documents that have the same fingerprint. The signature key may also be used for comparison purposes. In one embodiment, the signature key generator 123 hashes a fingerprint into an MD5 (message digest algorithm 5) signature key. Other hashing functions may also be used without detracting from the merits of the present invention.

Figure 2:
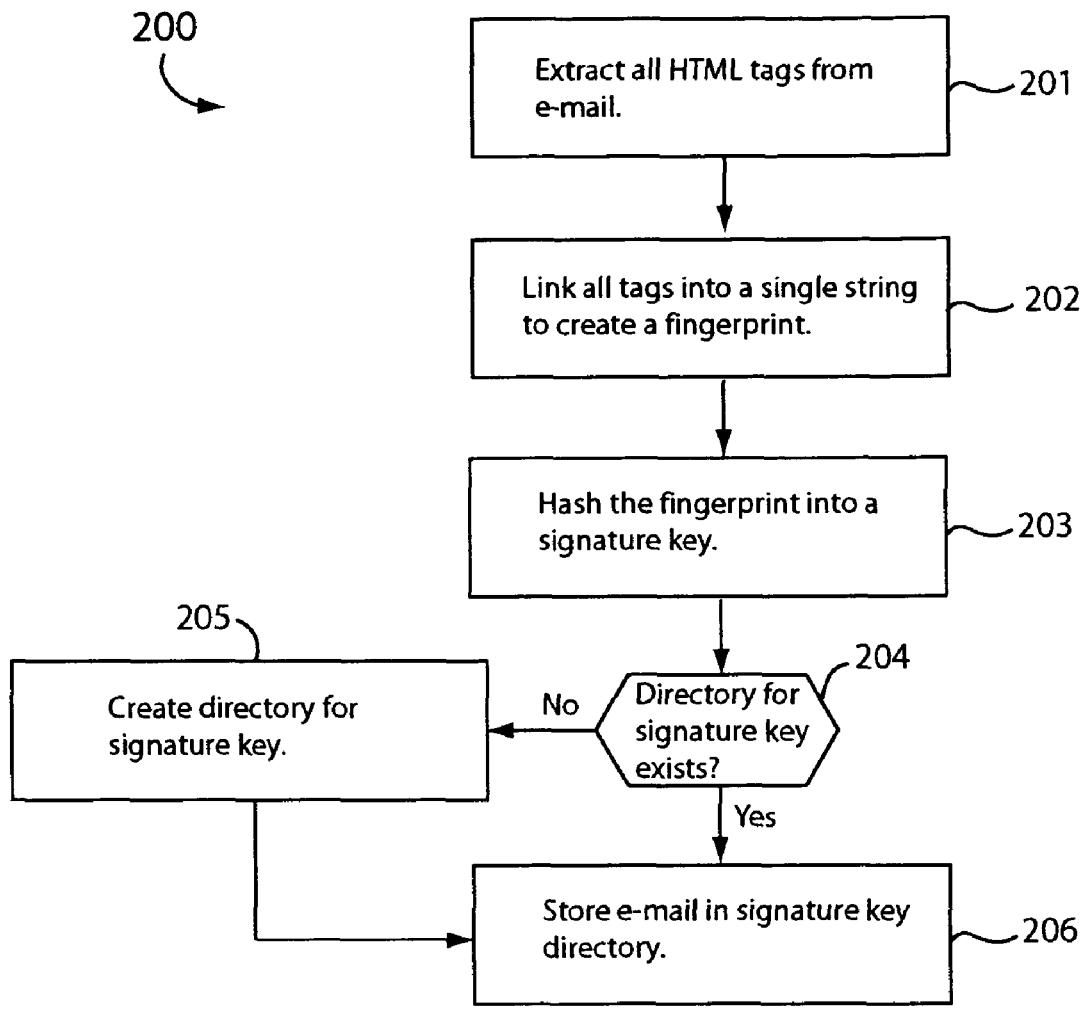
FIG. 2 shows a flow diagram of a method of grouping of documents that contain markup language code, in accordance with an embodiment of the present invention.

FIG. 2 shows a flow diagram of a method 200 of grouping documents that contain markup language code, in accordance with an embodiment of the present invention. The method 200 is explained using e-mails for illustration purposes only, not as a limitation. As can be appreciated, the method 200 may also be used on other types of documents, including web pages.

The method 200 may be performed on a plurality of e-mails (or web pages) available in the computer shown in FIG. 1. For example, the plurality of e-mails may be stored in a data storage device 106. The method 200 may be performed on each e-mail in the plurality of e-mails. In step 201, the tag extractor 121 extracts all HTML tags from an e-mail in the plurality of e-mails. In one embodiment, the tag extractor 121 extracts all HTML tags from the e-mail without including texts and tag attributes. In step 202, the fingerprint generator 122 links together the extracted HTML tags to form a fingerprint of the e-mail. In step 203, the signature key generator 123 uses a hashing function (e.g. MD5 function) to generate a signature key for the fingerprint. In step 204, the signature key generator 123 (or other component of the classifier module 120) checks to see if there is already a directory for the generated signature key. For example, the signature key generator 123 may look for a directory that is named after the signature key. If there is no existing directory for the signature key, the signature key generator 123 creates one in step 205, and stores the e-mail in that directory in step 206. If there is an existing directory for the signature key, the signature key generator 123 simply stores the e-mail in that directory in step 206. The method 200 may be performed for each e-mail in the plurality of e-mails, resulting in e-mails with the same fingerprint being grouped together in a particular signature key directory.

As can be appreciated, each signature key directory resulting from the method 200 contains the same e-mails or similarly structured e-mails. The grouped e-mails may be used in several applications. Each group of e-mails may be used to train an anti-spam engine, or to allow a rule creator to detect a common pattern describing the e-mails. For example, each group of e-mails may be analyzed to find a common pattern that can be used to detect a particular type of spam.

FIGS. 3(a), 3(b), 3(c), and 3(d) illustrate an example processing of an e-mail using the method 200. FIG. 3(a) shows the original content of an e-mail prior to processing. In the example of FIG. 3(a), the e-mail content comprises HTML code. FIG. 3(b) shows the HTML tags extracted by the tag extractor 121 from the e-mail. Note that the extracted HTML tags in FIG. 3(b) do not include the texts of the e-mail and tag attributes. FIG. 3(c) shows the extracted HTML tags being linked together by the fingerprint generator 122 to generate a fingerprint. In the example of FIG. 3(c), the fingerprint generator 122 concatenates the extracted HTML tags into a single string using separation codes "(/x0d/x0a)" to identify where the HTML tags are joined. The separation codes have been bordered in FIG. 3(c) for ease of illustration. The separation codes may be used to unravel the fingerprint, if desired. FIG. 3(d) shows the resulting fingerprint of the e-mail. Note that in both FIGS. 3(c) and 3(d), the fingerprint is a single continuous string but is not shown as such due to page printing limitations; there are no spaces between HTML tags in FIGS. 3(c) and 3(d). The fingerprint shown in FIG. 3(d) may be input into a hashing function to generate a signature key.

Figure 4:
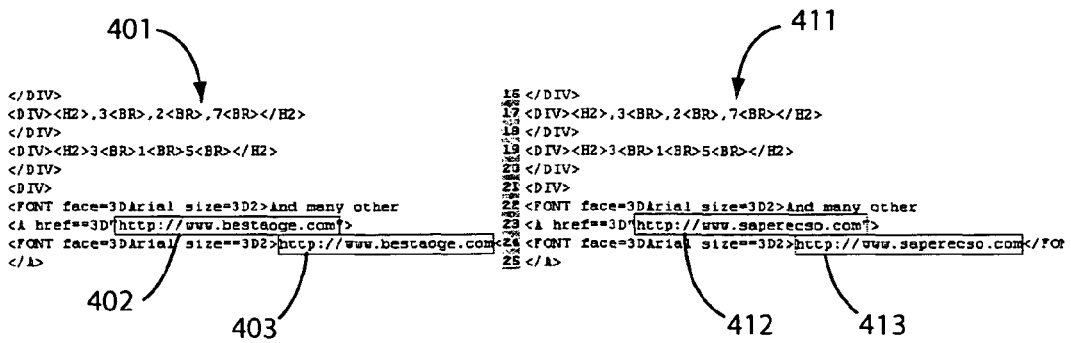
FIG. 4 shows example e-mails with different contents but will have the same fingerprint.

Because a fingerprint is indicative of a document's structure rather than its exact content, e-mails having the same structure but different contents may have the same fingerprint. Embodiments of the present invention thus allow identification of structurally similar e-mails that may or may not have the same contents. This is particularly advantageous in anti-spam applications because spammers may exploit the flexibility of markup languages to create spam e-mails that are essentially the same albeit with different actual contents to confuse anti-spam algorithms. FIG. 4 shows example e-mails 401 and 411, which are two separate e-mails. E-mail 401 includes references to web server addresses 402 and 403. Similarly, e-mail 411 includes references to web server addresses 412 and 413. Except for the web server addresses, e-mails 401 and 411 are essentially the same; e-mails 401 and 411 have the same HTML structure. Using the method 200, e-mails 401 and 411 will have the same fingerprint and, accordingly, will be advantageously grouped together in the same signature key directory or identified as similar e-mails.

As can be appreciated from the foregoing, embodiments of the present invention facilitate identification of documents containing markup language code. For example, the tag extractor 121 and the fingerprint generator 122 may be used to create a fingerprint of an e-mail or web page received in the computer of FIG. 1. The fingerprint may then be compared to other fingerprints of known classification. For example, the fingerprint of an e-mail may be compared to fingerprints of known spam e-mails to determine if the e-mail is spam. As another example, the fingerprint of a web page may be compared to fingerprints of known web pages to identify the web page or web server (or website) serving the web page.

Figure 5:
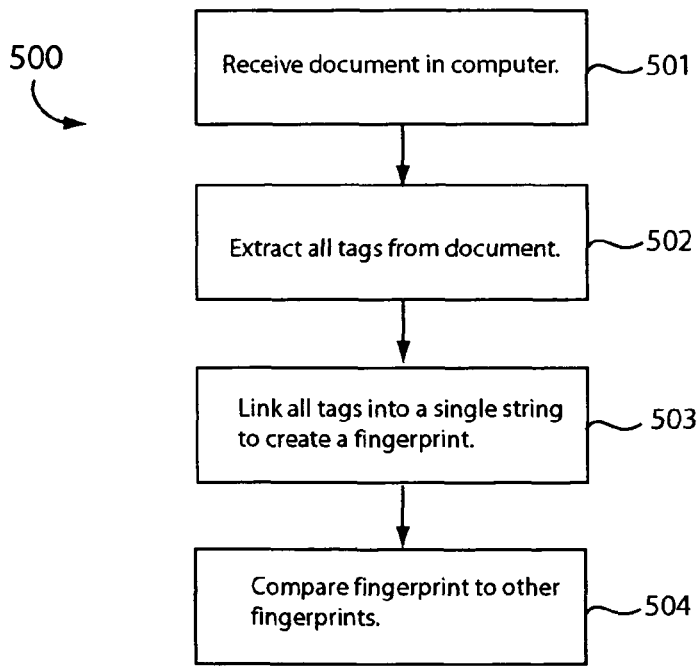
FIG. 5 shows a method of identifying a document containing markup language code in accordance with an embodiment of the present invention.

FIG. 5 shows a method 500 of identifying a document containing markup language code in accordance with an embodiment of the present invention. In step 501, a document (e.g. e-mail or web page) containing markup language code (e.g. HTML code) is received in a computer. In step 502, the tag extractor 121 extracts all markup language tags from the document. In step 503, the fingerprint generator 122 links all of the extracted tags together to create a fingerprint of the document. In step 504, the fingerprint is compared to other fingerprints previously generated from known documents to identify the document. For example, if the document comprises an e-mail and the fingerprint matches the fingerprint of known spam e-mails, the e-mail may be deemed as spam. As another example, if the document comprises a web page and the fingerprint matches the fingerprint of a prohibited web page, the document may be deemed as being served by a web server known to be serving the prohibited web page. The above-described embodiments may be employed in other applications without detracting from the merits of the present invention.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of grouping e-mails that contain HTML (HyperText Markup Language) code, the method to be performed by a computer and comprising:
   (a) extracting HTML tags from an e-mail in a plurality of e-mails;
   (b) forming a fingerprint of the e-mail by linking together the extracted HTML tags to form a single string;
   (c) hashing the fingerprint to form a signature key; and
   (d) grouping the e-mail with other e-mails having the same fingerprint.

2. The method of claim 1 wherein grouping the e-mail with other e-mails having the same fingerprint comprises storing the e-mail in a directory for the signature key.

3. The method of claim 1 further comprising:
   repeating steps (a), (b), (c), and (d) for other e-mails in the plurality of e-mails.

4. The method of claim 1 wherein forming a fingerprint of the e-mail by linking together the extracted HTML tags comprises:
   concatenating the extracted HTML tags to form the single string.

5. The method of claim 4 wherein the concatenated extracted HTML tags include separation codes demarcating where the extracted HTML tags have been concatenated together.

6. The method of claim 1 wherein the e-mail comprises spam e-mail and is grouped together with other spam e-mails having the same fingerprint.

7. A computer comprising:
   a tag extractor configured to extract markup language tags from a document containing markup language code; and
   a fingerprint generator configured to generate a fingerprint of the document containing markup language code, the fingerprint being indicative of a structure of the markup language code in the document, the fingerprint generator being configured to generate the fingerprint by forming together markup language tags extracted by the tag extractor from the document.

8. The computer of claim 7 further comprising:
   a signature key generator configured to hash the fingerprint to generate a signature key of the fingerprint.

9. The computer of claim 8 wherein the signature key is configured to be used to create a directory for the e-mail and other e-mails having the same fingerprint as the e-mail.

10. The computer of claim 7 wherein the markup language comprises HTML.

11. A method to be performed by a computer, the method comprising:
    extracting markup language tags from a document; and
    forming a structure identifier indicative of a structure of markup language code in the document, the structure identifier being formed from the markup language tags extracted from the document.

12. The method of claim 11 wherein the structure identifier is formed by concatenating the markup language tags extracted from the document.

13. The method of claim 12 wherein the concatenated markup language tags include separation codes.

14. The method of claim 11 wherein the document comprises an e-mail received in the computer.

15. The method of claim 14 further comprising:
    comparing the structure identifier with structure identifiers of spam e-mails to determine if the e-mail is spam.

16. The method of claim 11 wherein the document comprises a web page received in the computer.

17. The method of claim 16 further comprising:
    comparing the structure identifier with other structure identifiers to identify a web server serving the web page.

18. The method of claim 11 further comprising:
    hashing the structure identifier to generate a signature key.

19. The method of claim 18 further comprising:
    creating a directory for the signature key; and
    storing the document in the directory along with other documents with the same structure identifiers.

20. The method of claim 11 wherein the markup language comprises HTML.

* * * * *